Sept. 5, 1961
H. A. DZAACK
2,998,858
SCALE WITH AUTOMATIC CALCULATION OF PRICE
Filed Oct. 19, 1956
5 Sheets-Sheet 1
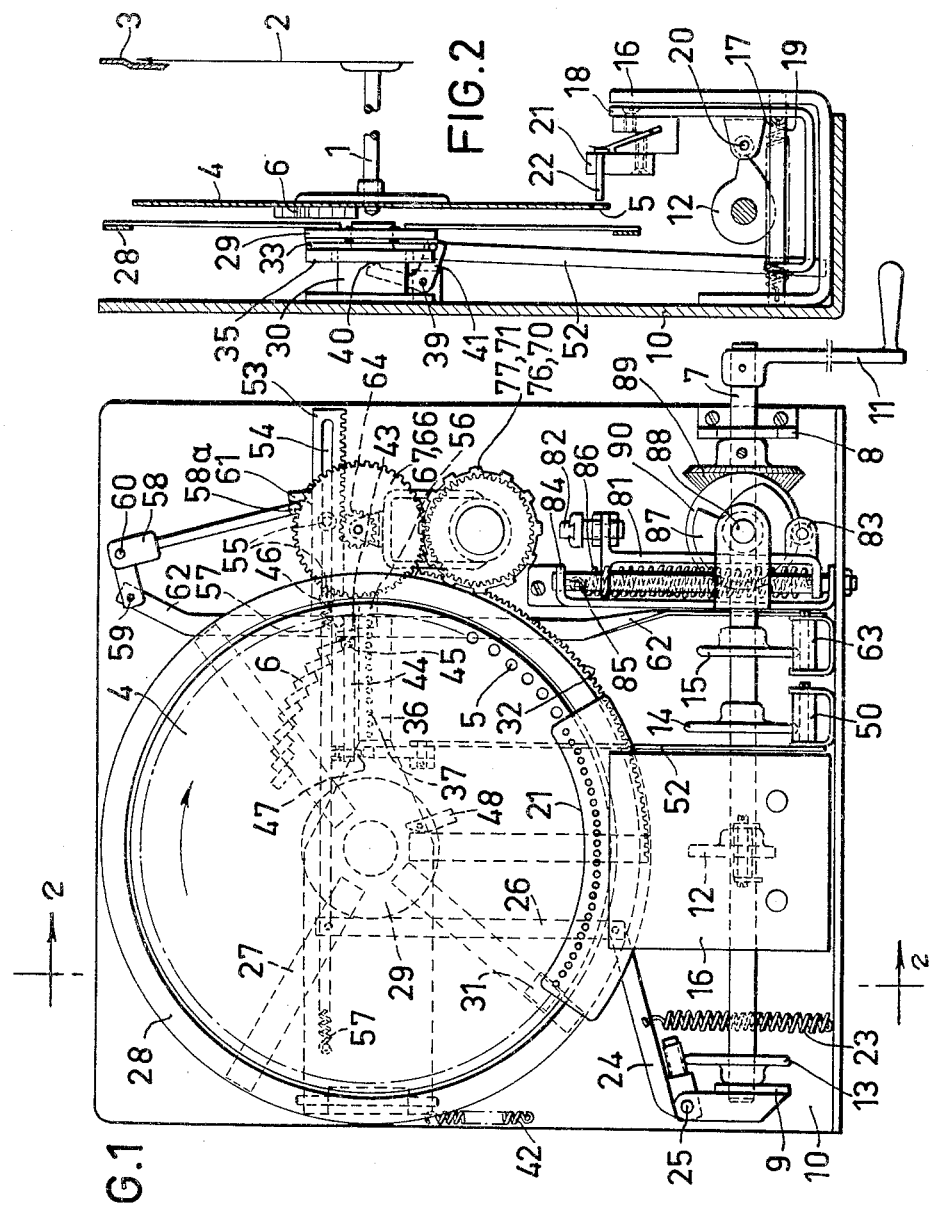
Inventor
H. A. Dzaack
By Glasera&Dowing Seebold
Attys.

Sept. 5, 1961  H. A. DZAACK  2,998,858
SCALE WITH AUTOMATIC CALCULATION OF PRICE
Filed Oct. 19, 1956  5 Sheets-Sheet 2
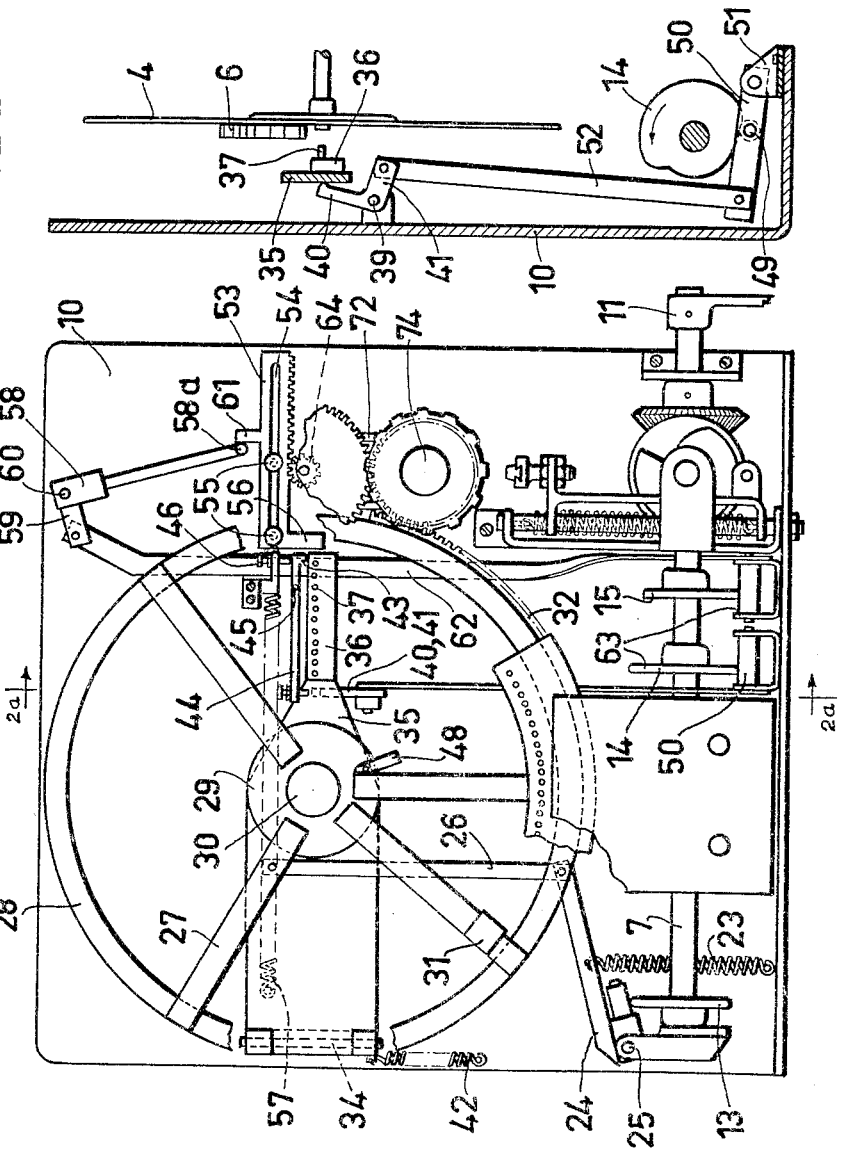

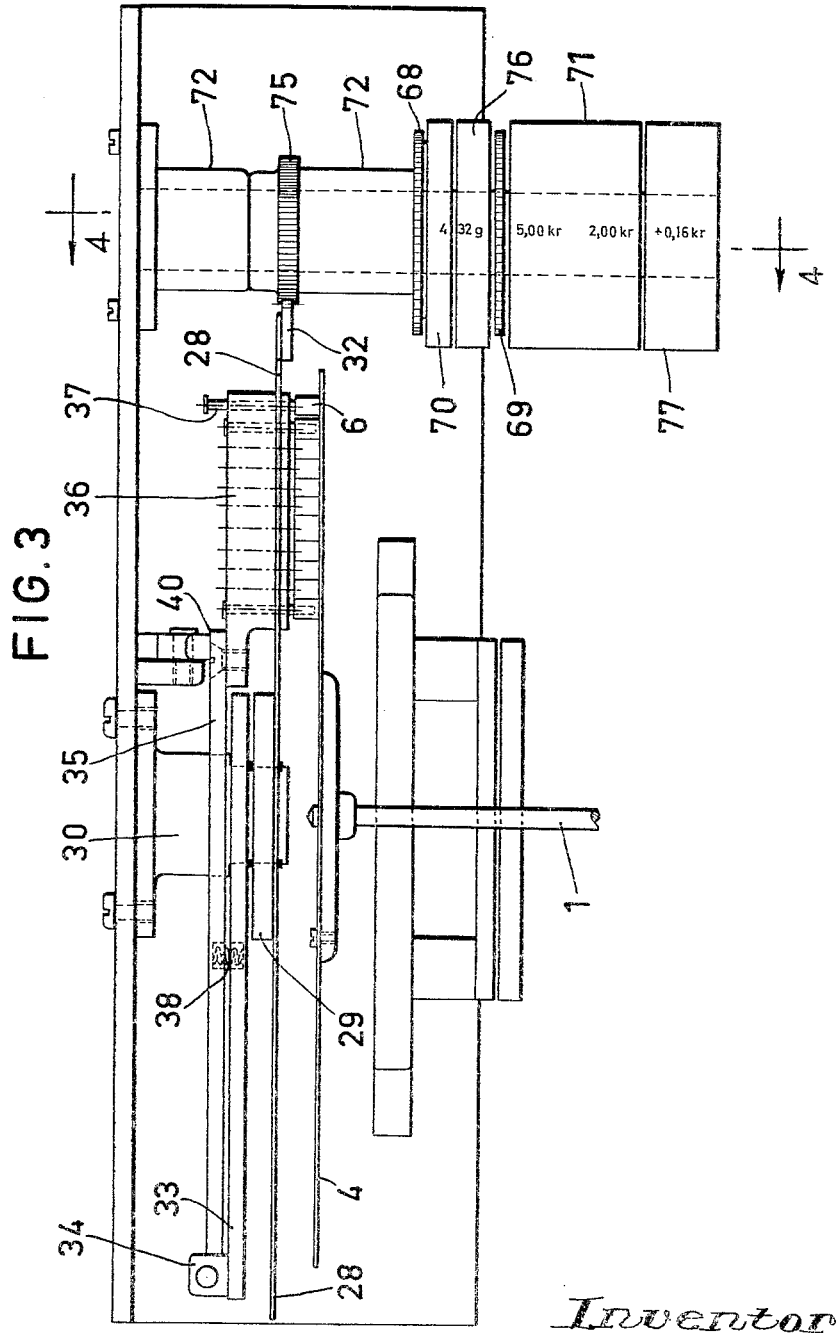

Inventor
H.A.Dzaack

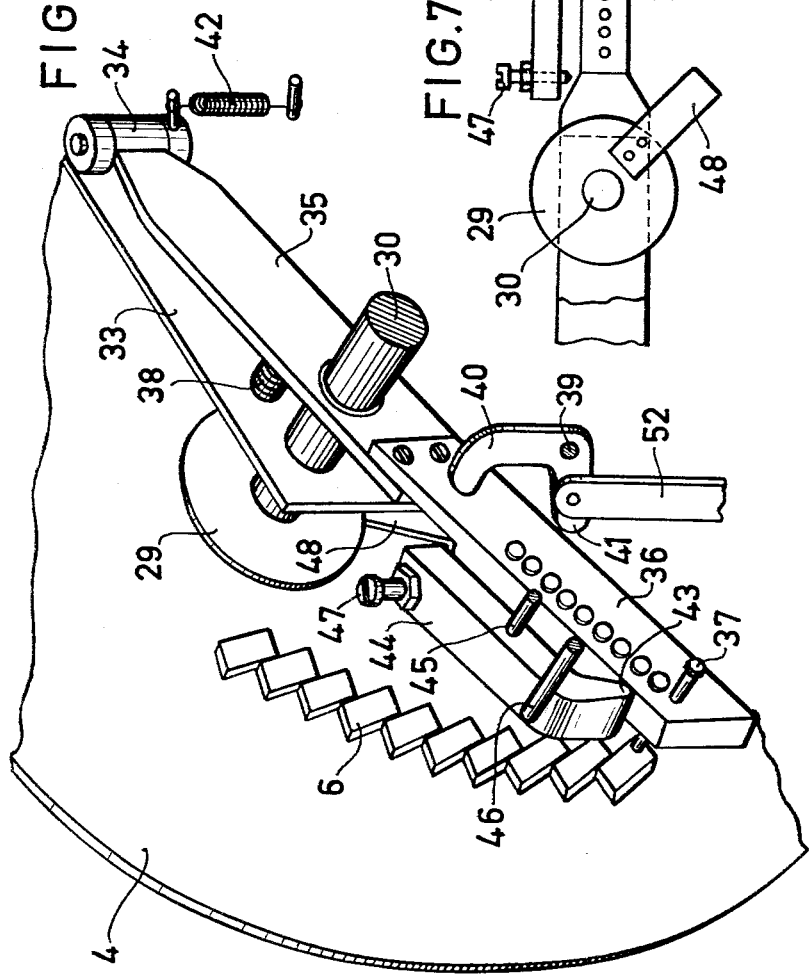

United States Patent Office 2,998,858
Patented Sept. 5, 1961

2,998,858
SCALE WITH AUTOMATIC CALCULATION OF PRICE
Heinz Adolf Dzaack, Eskilstuna, Sweden, assignor to Kooperativa Förbundet Ekonomisk Förening, Stockholm, Sweden
Filed Oct. 19, 1956, Ser. No. 617,154
Claims priority, application Sweden Oct. 21, 1955
3 Claims. (Cl. 177—2)

Particularly as far as automatic scales are concerned the reading-off of the weight and the calculation of the price by reading-off and interpolation are very time-wasting. The reading-off of the weight and the calculation of the price will often be incorrect. As long as all these operations must be carried out individually there will be risk of incorrect calculation. The object of the present invention is to eliminate these drawbacks and to make it possible to make the reading-off and calculation operations purely mechanically, a print on a ticket or a form being obtained as receipt.

The present invention relates to a device in measuring apparatus, particularly scales, for recording automatically the value measured and the price corresponding thereto, and the invention is substantially characterized in that feelers are arranged, by feeling a member movable in response to the valued measure, to determine the measured number of units of a certain value and to adjust correspondingly a recording device for recording the said number of said units as well as to adjust a recording device for recording a price proportional to the said number, and that other feelers are arranged, by feeling a member movable in response to the value measured, to determine the number of surplus or additional smaller units, of the said value, and to adjust correspondingly a recording device for recording the said number of smaller units close to the record of the first-mentioned greater units, and to adjust a recording device for recording the price corresponding to the said smaller units close to the record of the first-mentioned price recorded.

Embodiments of the invention are shown in the accompanying drawings.

FIG. 1 shows a front view of an apparatus according to the invention.

FIGURE 1a is a view similar to FIGURE 1 with portions broken away for clarity.

FIGURE 2 is a sectional view along line 1—1 of FIG. 1.

FIG. 2a is a sectional view along line 2a—2a of FIG. 1a.

FIG. 3 is a top view of FIG. 1, showing several of the elements in enlarged form.

FIG. 5 shows a detail of a cam device as shown in the lower part of FIG. 2a.

FIGS. 6 and 7 are enlarged detailed views of some of the elements of the structures shown in FIGS. 1 and 1a.

Figure 5:
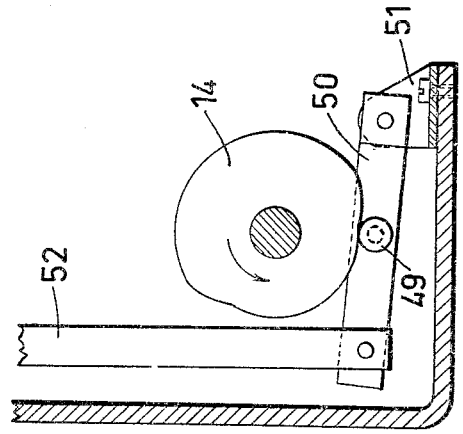

To one end of the shaft 1 of the balance a pointer 2 is fixed, which points towards the graduated dial 3 attached to the balance. The reading-off of the weight is carried out in a well known manner. A disc 4 with holes is fixed to the other end of the shaft 1. The said disc 4 is provided with a number of holes 5 for feeling a lower unit of weight, the said holes being evenly distributed along the arc of an angle, the total size of which equals the graduation of the said dial, that is, equal with the total angular deviation of the pointer, which will be approximately one eighth of a turn. Besides, on the disc there are provided a number of adjustable stop contacts 6 for feeling a higher weight unit and determining the total angular deviation. When the scale is loaded, the shaft 1 and the pointer 2 attached thereto and the disc 4 are turned in the clockwise direction (FIG. 1).

All the feeling and recording means of the apparatus are driven by a shaft 7, which is mounted in bearings 8, 9 on the frame plate 10. When a crank 11 provided on the shaft 7 is turned, cam discs 12, 13, 14, 15 attached to the said shaft 7 will turn therewith, and the cam 12 will first actuate a drive means (FIG. 2). A yoke 16 which is attached to the frame plate 10 carries two pins 17 between its legs. On these pins 17 a yoke 18 moves, which is pulled to the left by a spring 19, whereby a roller 20 connected with the yoke will always have contact with the cam 12. In a pinholder 21 which is rigidly connected with the yoke 18 a number of pins 22 are movably arranged, which preferably are spring-actuated inwards towards the disc 4 and which are arranged in a similar manner in relation to the holes 5 in the disc 4 as the vernier lines of a vernier scale in relation to the lines of an appurtenant scale. When the cam 12 is turned from the zero position, the yoke 18 and the pinholder 21 will move towards the disc 4, and one of the pins 22 which corresponds to the smallest weight unit, will penetrate into one of the holes 5. Thereby the position of the disc 4 will be fixed.

The number of smaller units, viz. 4-gramme-weights is sensed by the pins 22, FIG. 2, cooperating with the holes 5 in the disc 4, according to a vernier principle. This principle is very simple:

The distance apart of the pins 22 is 24/25 of the hectogramme division of the disc, that is the distance apart of the holes 5. In the zero position of the disc the first pin from the left is situated in front of the first hole 5. When the weight is 4 grammes, the disc has turned clockwise $\frac{1}{25}$ of the said division, and the second pin is in front of the second hole, so that when engaging this hole it will indicate 4 grammes, and so on, so that when the weight is $24 \times 4 = 96$ grammes the 25th pin is in front of the 25th hole and when engaged therein will indicate 96 grammes. When the weight is $25 \times 4 = 100$ grammes the first pin is again in front of a hole in the disc, viz. the said second hole, and will indicate 0 grammes, and at the same time 1 hectogramme is indicated by means of the pins 37 for the greater units.

When the turning is continued, the cam disc 13 allows a spring 23 to pull an arm 24, which is mounted in bearings 25, downwards. A link 26 is movably connected at its lower end with the arm 24 and at the top with one of the arms 27, which carry a circular ring 28 on a hub 29 which is mounted on a center 30 coaxial with the shaft 1, the said center being rigidly connected with the frame plate 10. Thus, through the action of the spring 23 the circular ring 28 will move in the counter clockwise direction in a well known manner, until a stop arm 31 rigidly connected with the circular ring 28 strikes against the inner end of the pin 22 which has entered one of the holes 5. Thereby the feeling of the smallest unit has been completed. Along a part of the circumference of the circular ring 28 there is a toothed segment 32, which, when the circular ring moves, drives the below-described typewheel for the said lower weight unit.

The feeling device for the greater unit is also mounted on the center 30 (FIG. 3) through an arm 33, which, through a hinge-like device 34, is connected to an arm 35, on which a second pinholder 36 with its spring-loaded and movable pins 37 is mounted. Thus, the pinholder 36 can turn round the said center 30 and also approach and withdraw from the disc 4 through the action of the hinge-like device 34. A pressure spring 38 pushes the arm 35 with the pinholder 36 away from the arm 33, so that the arm 35 rests against the upper arm 40 of a joint lever consisting of two arms 40, 41 mounted in a firm point 39 (FIG. 2). A spring 42, FIG. 1, is attached to the hinge-like device 34 so that the latter is pulled downwards about pivot 30, whereby the pinholder 36 is pulled upwards, so that its upper side is brought into contact with an abutment 43 at the right end of a rocking arm 44 mounted on a shaft 45, the counterclockwise motion of the said rocking arm being restricted by an adjustable stop 46. On the lefthand portion of the rocking arm 44 an adjustable stop 47 is provided. When the circular ring 28 is turned to a position corresponding to one of the highest numbers of smaller units before each whole number of hectogrammes, a stop 48 on the hub 29 thereof will come into contact with the stop 47, whereby the lefthand portion of the rocking arm 44 is raised at the same time as the righthand portion 43 presses down the pinholder 36 for the purpose described below.

Upon further turning of the shaft 7 (FIG. 5) the cam disc 14 depresses a roller 49 (see FIG. 2a). A lever 50 on which the roller 49 is mounted, is mounted on the frame plate 10 through a bearing 51 and movably connected to the arm 41 through a connecting link 52. Thus, when the lever 50 moves downwards, the arm 40 (FIGS. 2 and 3) will press the arm 35 and thus also the pinholder 36 against one of the stop contacts 6 on the disc 4 (position shown in FIG. 3), whereby the pin 37 that corresponds to the higher weight unit will be pushed back by the corresponding stop contact.

The feeling of this greater weight unit, that is, which of the pins 37 has come into contact with its contact 6, is carried out by means of a rack 53 (FIG. 1) which with a slot 54 is movably mounted on guide pins 55 fixed to the frame plate 10. The lefthand portion of the rack is formed at the bottom with a stop 56, which, when moving to the left (from the zero position shown) will pass behind those pins 37 which have not come into contact with their respective contact means 6, and is stopped by the head of the first pin 37 which rests against its contact 6. This motion is effected by a spring 57. In the zero position the rack is positively controlled through a joint lever 58, 59 (FIG. 1), which is mounted on a shaft 60 in the frame plate 10. The lower arm 58 of the joint lever rests with its end 58a against a stop 61 on the rack 53, and its upper arm 59 is movably connected with a connecting link 62, the lower end of which is attached to a lever 63, which rests, with a roller 63' (see FIG. 1a) against the cam disc 15 and is arranged in a similar way as the lever 50 in FIG. 5.

Figure 4:
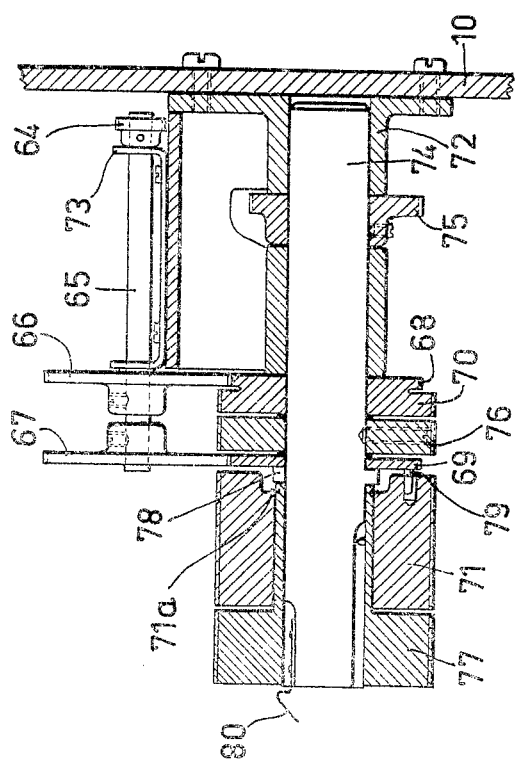
FIG. 4 shows a section along line 4—4 of FIG. 3, showing the typewheel bearing.

When the shaft 7 is turned farther, the cam 15 allows the lever 63 to be raised through the action of the spring 57, which pulls the rack 53 to the left until its stop 56 strikes against some pin 37, and which then, via the stop 61 of the rack, the joint lever 58, 59, and the link 62, pulls the lever 63 upwards. When the rack 53 is thus moved, the teeth at its underside drive a toothed wheel 64 (FIG. 4) attached to the shaft 65, whereby toothed wheels 66, 67 attached to the same shaft drive toothed wheels 68, 69 connected with type wheels 70, 71, so that the latter will be turned forwards correspondingly.

The whole typewheel device is attached to the frame plate 10 by means of bearings 72, 73. A shaft 74 which is rotated axially by a toothed wheel 75 attached to the shaft, runs in the bearing 72. To the shaft 74 a typewheel 76 is attached, and in the lefthand portion of the shaft a key-way or the like is provided in which a pin from a typewheel 77 serves as driver. Thus, when the shaft 74 rotates, only the typewheels 76 and 77 travel therewith. On the typewheel 76 the lower weight unit is engraved, and on the typewheel 77 the price at a certain unit price for corresponding weight units are engraved. The typewheel 70 on which the greater weight unit is engraved, runs freely on the shaft 74, between the bearing 72 and the typewheel 76, and its rotation is transmitted from the shaft 65 via the toothed wheels 66 and 68. The toothed wheel 69 runs freely between a shoulder 78 on the shaft 74 and the typewheel 76 and is provided with a driver pin 79 which drives the typewheel 71 on which are engraved the unit price and the computed price corresponding to the weight, engraved on the typewheel 70, at a certain unit price. The typewheel 71 is mounted on a sleeve provided on the typewheel 77 and restricted to the right by a stop ring 71a on the shaft. The typewheels 77 and 71 are retained on the shaft by a spring 80 attached in a groove in the shaft. If the spring 80 is pressed inwards against the shaft, the two typewheels 77, 71 therefore can be removed from the shaft 74 and be replaced by such typewheels on which the prices engraved correspond to another unit price. The stamping position is at the underside of the typewheels.

A stop bracket 81 with a stamping pad 82 and a roll 83 is displaceably mounted in a bearing bracket 84 by means of guide pins 85 attached in the latter and is biased upwards by a spring 86, so that the roll 83 rests against a cam disc 87 which is mounted on a shaft 88 attached to the bracket 84, which is screwed into the frame plate 10.

The motion of recording is transmitted by rotation of the shaft 7 having a conical toothed wheel 89 meshed with a conical toothed wheel 90 mounted on the shaft 88, the said toothed wheel 90 being connected with the cam 87, so that the latter turns in the counter clockwise direction, and when the indentation in the cam disc 87 is located exactly opposite the roll 83, the roll and the stop bracket are released, whereby they are moved quickly upwards by the spring 86, so that the pad 82 pushes against the underside of the typewheels. If, before that, a coloured ribbon and a ticket or the like are applied between the pad 82 and the typewheels 70, 76, 71, 77, indicia will be printed on the ticket showing weight, unit price, and amount.

In order to describe more in detail the function of the device according to the invention a scale of the capacity of 1 kilogram is chosen as example. The smallest division on the scale of the balance and on the type wheels is 4 grammes. The device for calculating the price and for recording is connected to an automatic scale of common type in which the pointer of the scale moves within a small sector only, which, however, is not necessary.

When a parcel has been placed on the scales and the oscillation of the pointer has ceased, the course of registration can start. As the disc 4 is mounted on the same shaft 1 as the pointer 2, their motion will be of equal magnitude. When the crank 11 is turned, the shaft 7 moves and thus also the cams 13, 12, 14, 15 and through the conical toothed wheels 89, 90 also the cam 87. The form of the cams and their position in relation to the zero position is of such a kind that they start to function in accordance with a fixed sequence.

The cam 12 first moves through the action of the spring 19 the yoke 18 and the pinholder 21 towards the disc 4. In the balance capacity and graduation chosen the number of pins 22 in the pinholder 21 will be twenty-five corresponding to twenty-four holes 5 in the disc 4, that is, one pin for every fourth gramme. When the pinholder 21 is displaced towards the disc 4, that pin 22, that corresponds to the value of the weight, will penetrate into one of the holes 5. The pin remotest to the left is the zero pin, pin No. 2 corresponds to 4 grammes, et cetera. If the weight of the parcel is for example 12 grammes, pin No. 4 will penetrate into the corresponding hole. The position of the disc 4 is now fixed.

When the crank 11 is turned further, the cam 13 will carry out the next operation by allowing the spring 23 to move the arm 24 and the connecting link 26 downwards, so that the circular ring 28 mounted on the center 30 is caused to turn in the counterclockwise direction, until the member 31 provided on the ring 28 comes into contact with that pin 22 that has penetrated into one of the holes 5 in the disc 4. At the same time as the circular ring 28 has turned as much as corresponds to the smallest weight unit, the toothed segment 32 provided on the ring, through its engagement with the toothed wheel 75 (FIG. 4), has turned the shaft 74 and the typewheels 76 and 77 rigidly connected therewith correspondingly, so that the latter are set in stamping position, that is, that the smaller weight unit now can be read at the underside of these typewheels, that is, number of grammes between each whole hectogramme, and on the typewheel 77 also the price corresponding to the number of grammes for a certain determined unit price.

When the cam 13 has completed its motion, the lever 50 (FIG. 5) through the cam 14, the radius of which increases, will pull the link 52 downwards and swing the joint lever 40, 41 (FIG. 2), under the counteraction of the pressure spring 38 (FIG. 3), so that the holder 36 carrying the pins 37 and secured on the arm 35 is swung, by means of the hinge-like device 34, towards the contact means 6 at the rear side of the disc 4, whereby that of the pins 37 that corresponds to the whole hectogramme value of the weight of the parcel will be stopped by the contact means 6 for corresponding hectogrammes. The number of such pins amount to eleven, from "0" to "10" inclusive. In FIG. 3 the pin 37 farthest to the right has established contact with its contact means, that is, the weight of the parcel is less than one hectogramme. As the angle of turning of the pointer 2 and the disc 4 for every increase of the load by one gramme is very small, it would be very difficult to carry out the adjustment of the contact means 6. When the load is for example "197" grammes, the balance will stamp "196" grammes, that is, the second pin shall be stopped by its contact member, but when the load is "200" grammes, the balance will stamp "200" grammes, that is, the third pin is stopped, while pin No. 2 must go entirely free. In order to eliminate this difficulty the pinholder 36 has been made swingable round the shaft of the disc 4, as mentioned above, so that the pins 37 travel clock-wise with their respective contact means 6 at the last smaller values before each whole number of hectogrammes. This is effected thereby that the stop 48 on the circular ring 28, when the angle of the turning is great, that is, when one of the pins 22 farthest to the right goes through a hole in the disc 4, comes into contact with the stop 47 on the rocking arm 44, whereby its right hand portion 43 depresses the pinholder 36, which, being mounted on the center 30, is turnable via the arms 35 and 33.

Thus, instead of the pinholder 36 being swung downwards, as in the embodiment shown, when the number of smaller units is great, it is also possible to make such an arrangement that, when the number of smaller units is zero or small, the pinholder is swung upwards, that is, in the opposite direction of the direction of motion of the stop contact 6.

The motion of feeling of the whole number of hectogrammes takes place, when, at the continued rotation of the crank 11, the radius of the cam 15 decreases. The tension spring 57 fixed to the lefthand portion of the rack 53 tends to push the rack 53 to the left, which, however, is retained in the zero position by the joint lever 58, 59, the link 62, the lever 63 and the cam 15. When the radius of the latter decreases owing to the rotation of the shaft, the spring 57 pulls the rack to the left, until the movement is stopped owing to the fact that the stop 56 provided on the lower portion of the rack 53 comes into contact with the head of that pin 37 that is in withdrawn position, that is, that pin that is located opposite a stop contact 6. As the rack 53 is in engagement with the toothed wheel 64 (FIG. 4), the motion is transmitted simultaneously over the toothed wheels 66 and 67 attached to the shaft 65 to the toothed wheels 68 and 69 respectively, whereby the type wheel 70 for the total weight of hectogrammes, and, via the pin 79, the type wheel 71 for the price, at a corresponding weight at a determined unit price, are set on recording position.

The conical toothed wheels 89 and 90 now have turned the cam disc 87 (FIG. 1) into such a position that the roll 83 lies immediately before the indentation in the cam disc, and therefore, at a further minor turning the stop bracket 81 with the stamping pad 82 is set free and is moved forcefully upwards against the type wheels by the spring 86. If a type ribbon and a ticket or the like are previously applied between the pad and the type wheels, a print is effected on the ticket, showing weight, unit price and amount, for example "212 grammes, 5 crowns, 1.00 crown+0.06 crowns."

Upon continued rotation of the shaft all return movements, which are all positively controlled by the respective cam discs, take place, whereby all tension springs are also stretched. The whole cycle of operation corresponds to one revolution of the shaft 7, which motion can be carried out manually or by means of a motor.

If the weight and price stamping is to be made with regard to parcels containing goods of another unit price, the type wheels 71 and 77 must be changed.

Also other embodiments are possible within the scope of the invention. Thus, instead of the feeling device shown here for the smaller weight units other feeling devices may be used. Instead of type wheels bars can be used, and instead of manual operation the device can be driven electrically, for example by a motor, a magnet and the like.

Neither need the feelers for the greater unit and those for the smaller unit cooperate with the same disc 4, but they can cooperate each with their individual member movable in response to the measure size, for example two discs attached to the same shaft. In the embodiment shown in the drawing the number of smaller units of the measure value are recorded at the left side of the number of greater units, and the price corresponding to the number of smaller units is recorded at the left side of the price corresponding to the number of greater units, but it is also possible to record the number of greater and smaller units, for example above each other, as also the corresponding prices. The main thing is that the weights or the like are recorded near each other, so that they can be read together and also that the corresponding prices are recorded near each other, so that they can be read together.

What I claim is:

1. In a measuring apparatus, a device for determining the weight of a product and recording such weight in whole units of measure and proportional parts thereof comprising a first member movable a distance proportional to a weight and having first index means thereon, an array of spaced index members corresponding to the proportional parts of the weight movable from a fixed position to engage an index member with the index means, second index means on the first movable member comprising a plurality of abutments thereon spaced in the direction of movement thereof and in a direction substantially transverse to the direction of such movement so that they are in staggered relation, each abutment corresponding to a whole unit of measure, a second member mounted for movement in a direction parallel to and also toward said first member, a plurality of aligned displaceable pins carried by the second member for displacement of a pin upon engagement with an abutment in register therewith when the second member is moved toward the fixed member, first movable means movable from an initial position to cooperate with an index member engaged with the index means for recording the proportional weight corresponding thereto, second movable means cooperating with a displaced pin to record the whole unit of weight corresponding to the abutment in register therewith, and means secured to the first movable means to move the second member together with the displaceable pins carried thereby parallel to the first member, the means secured to the first movable means being at a position thereon corresponding to one end of the array of index members, whereby ambiguities at a transition between a whole unit and a proportional part of a unit adjacent the whole unit are prevented.

2. In a measuring apparatus as defined in claim 1, in which the second member is moved in a direction parallel to and opposite that of the first member, the means secured to the first movable means being at a position thereon with respect to the array of pins corresponding to the higher proportional part of a unit of weight.

3. In a measuring apparatus as defined in claim 1, including stamping means operatively associated with both recording means, and operating means for sequentially moving the index members to engage one member with the index means, to move the first movable means, to move the second member toward the first member and to operate the stamping means associated with the recording means.

References Cited in the file of this patent
UNITED STATES PATENTS

| | | |
|---|---|---|
| 276,292 | Seymour | Apr. 24, 1883 |
| 1,284,188 | Goss | Nov. 5, 1918 |
| 2,092,957 | Cuenoud | Sept. 14, 1937 |
| 2,207,996 | Basquin | July 16, 1940 |
| 2,577,820 | Singleton | Dec. 11, 1951 |
| 2,780,201 | Dzaack | Feb. 5, 1957 |
| 2,792,208 | Merrill et al. | May 14, 1957 |
| 2,792,275 | Drillick et al. | May 14, 1957 |
| 2,876,543 | Dzaack | Mar. 10, 1959 |

FOREIGN PATENTS

| | | |
|---|---|---|
| 64,747 | Norway | Jan. 4, 1937 |